(12) United States Patent
Lamb

(10) Patent No.: US 7,654,365 B2
(45) Date of Patent: Feb. 2, 2010

(54) TWO-PIECE FLOATING DISC BRAKE ASSEMBLY

(76) Inventor: Roger A. Lamb, 1259 W. Ninth St., Upland, CA (US) 91786

( * ) Notice: Subject to any disclaimer, the term of this patent is extended or adjusted under 35 U.S.C. 154(b) by 626 days.

(21) Appl. No.: 11/486,651

(22) Filed: Jul. 14, 2006

(65) Prior Publication Data

US 2007/0193837 A1  Aug. 23, 2007

Related U.S. Application Data

(60) Provisional application No. 60/775,261, filed on Feb. 21, 2006.

(51) Int. Cl.
*F16D 65/12* (2006.01)
(52) U.S. Cl. ................. 188/18 A; 188/218 XL
(58) Field of Classification Search ........... 188/218 XL, 188/18 A, 26; 192/70.16, 70.2
See application file for complete search history.

(56) References Cited

U.S. PATENT DOCUMENTS

| | | | |
|---|---|---|---|
| 5,281,004 | A | 1/1994 | O'Leary, Jr. |
| 6,116,386 | A | 9/2000 | Martin |
| 6,116,387 | A | 9/2000 | Kao et al. |
| 6,247,562 | B1 | 6/2001 | Gotti et al. |
| 6,267,210 | B1 | 7/2001 | Burgoon et al. |
| 6,302,246 | B1 | 10/2001 | Näumann et al. |
| 6,336,531 | B1 | 1/2002 | Chou |
| 6,357,561 | B2 | 3/2002 | Ruiz |
| 6,446,765 | B1 | 9/2002 | Dabertrand et al. |
| 6,561,298 | B2 | 5/2003 | Buell et al. |
| 6,604,613 | B2 | 8/2003 | Burgoon et al. |
| 6,926,124 | B2 | 8/2005 | Matsuzaki |
| 6,964,323 | B2 | 11/2005 | Campbell |
| 6,988,598 | B2 | 1/2006 | Williams |
| 2003/0121733 | A1* | 7/2003 | Niebling et al. ........... 188/18 A |
| 2004/0140164 | A1 | 7/2004 | Burgoon et al. |
| 2004/0178030 | A1* | 9/2004 | Pacchiana et al. ..... 188/218 XL |
| 2004/0182660 | A1 | 9/2004 | Cavagna et al. |

FOREIGN PATENT DOCUMENTS

WO  WO9641967  *  6/1996

* cited by examiner

*Primary Examiner*—Robert A Siconolfi
*Assistant Examiner*—Anna Momper
(74) *Attorney, Agent, or Firm*—John D. Titus

(57) ABSTRACT

A two-piece floating disc brake assembly comprises a hub with a plurality of radially extending drive cogs that engage a corresponding plurality of teeth that extend radially inwardly from the disc brake rotor. The disc is retained to the rotor by a plurality of retainers that are bolted to the axially outward surface of the brake rotor to engage the axially outward surfaces of the drive cogs. Axially float of the brake disc relative to the brake hub is provided by a plurality of axially slots between the drive cogs that are deeper than the thickness of the drive cogs. Because the axial clearance is established by the depth of the radial slots alone, tolerance on axially float is easier to maintain and is independent of the thickness of the brake disc.

19 Claims, 5 Drawing Sheets

-PRIOR ART-

TWO-PIECE FLOATING DISC BRAKE ASSEMBLY

CROSS-REFERENCE TO RELATED APPLICATION

The present application claims benefit of U.S. Provisional patent application 60/775,261 filed Feb. 21, 2006.

BACKGROUND OF THE INVENTION

The present invention relates to vehicle braking systems and in particular to disc brake systems used in high performance vehicles. In conventional single-piece disc brake systems, the brake rotor is rigidly attached to the wheel or hub of the vehicle. With this type of attachment method, the wheel runout must be controlled to very tight tolerances. Otherwise, the runout of the wheel will be transmitted to the disc brake rotor, which can cause the brakes to chatter during braking. This is undesirable under any circumstances, but potentially dangerous in high performance and racing applications. Additionally, since the typical one-piece disc brake rotor has a bell shaped portion in addition to the disc shaped portion, thermal expansion of the disc portion of the brake rotor during braking introduces severe stresses on the bell portion of the rotor. Cyclic heating of the disc rotor and corresponding residual stresses can lead to brake rotor warpage.

As a result of the deficiencies of conventional one-piece disc brake rotors, two-piece "floating" disc brake assemblies have been employed in many high performance applications. Two-piece floating disc assemblies have several benefits. First, by using an aluminum bell for the hub section, a great deal of weight can be saved. Since the disc brake is both rotating and unsprung, the lighter aluminum bell benefits acceleration, braking and handling of the vehicle. Second, because the disc portion of the brake rotor is detached from the bell portion of the rotor, it can expand and contract with the cyclic heating and cooling inherent in normal braking applications without introducing stresses into the bell portion of the rotor. Therefore, warpage of the disc is virtually eliminated.

Controlling the tolerances between the disc and bell (or hub) portion of a two-piece brake assembly is critical for proper performance. Excessive circumferential clearance between the hub and bell portion can lead to severe impact loads when the brakes are applied. Similarly, axial clearance must be tightly controlled. If too little axial clearance is provided, runout of the bell will be transmitted to the disc producing undesirable chattering, and as the brakes heat up during braking, the disc portion of the two-piece floating brake assembly will bind against the hub introducing undesirable stresses. If too much axial clearance is provided, the disc portion can develop harmonic oscillations leading to poor performance, excessive wear, and even brakage of the disc and/or hub.

A prior art two-piece floating disc brake assembly as shown in FIG. 1 comprises a hub 12 and a disc 14. Hub 12 includes a plurality of axially extending bosses 16 that engage a plurality of radially extending slots 18 formed in disc 14. Disc 14 is retained against hub 12 by means of a plurality of retainers 20 which are secured to hub 12 by a corresponding plurality of threaded fasteners 22 and corresponding nuts 24. Circumferential clearance between disc 14 and hub 12 is maintained by machining slots 18 slightly wider than bosses 16. Axially clearance is maintained by machining disc 14 to be slightly thinner than the height of boss 16.

The prior art two-piece floating disc brake assembly is capable of performing superlatively as long as the tolerance between slots 18 and bosses 16 are maintained precisely. Because the axial clearance, however, is defined by two tolerances (the height of bosses 16 and the thickness of disc 14) elementary statistical tolerancing teaches that the actual clearance may have twice the tolerance of either of the two parts. For example, if the height of bosses 16 are held to a tolerance of ±0.005 inch and the thickness of disc 14 is also held to ±0.005 inch the actual axial clearance can be from a line-to-line fit, which would cause the disc to chatter from the hub runout, up to an axial clearance of 0.020 inches which would allow the disc to oscillate. Moreover, since the axial clearance is determined in part by the thickness of the disc, the axial clearance is difficult to control because the absolute thickness of the rotor is especially difficult to control while at the same time controlling the critical features of flatness and parallelism. Moreover, the clearance changes each time the brake rotor is resurfaced or replaced. Accordingly, what is needed is a two-piece floating disc brake assembly in which the axial clearance is defined by a single part rather than the interaction of multiple parts, so that axial clearance can be more easily controlled. Moreover, what is needed is a floating disc brake assembly in which the axial clearance is not dependent on brake rotor thickness, so that the clearance does not change if the rotor is resurfaced or exchanged.

SUMMARY OF THE INVENTION

The present invention comprises a two-piece floating disc brake assembly in which the axial float of the disc is controlled by the dimension of a single part. According to an illustrative embodiment of the present invention, the disc brake assembly comprises a hub with a plurality of radially extending drive cogs that engage a corresponding plurality of teeth that extend radially inwardly from the disc brake rotor. The disc is retained to the rotor by a plurality of retainers that are bolted to the axially outward surface of the brake rotor to engage the axially outward surfaces of the drive cogs. Axially float of the brake disc relative to the brake hub is provided by a plurality of axially slots between the drive cogs that are deeper than the thickness of the drive cogs. Because the axial clearance is established by the depth of the radial slots alone, tolerance on axially float is easier to maintain and does not change if the brake disc is resurfaced or replaced.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
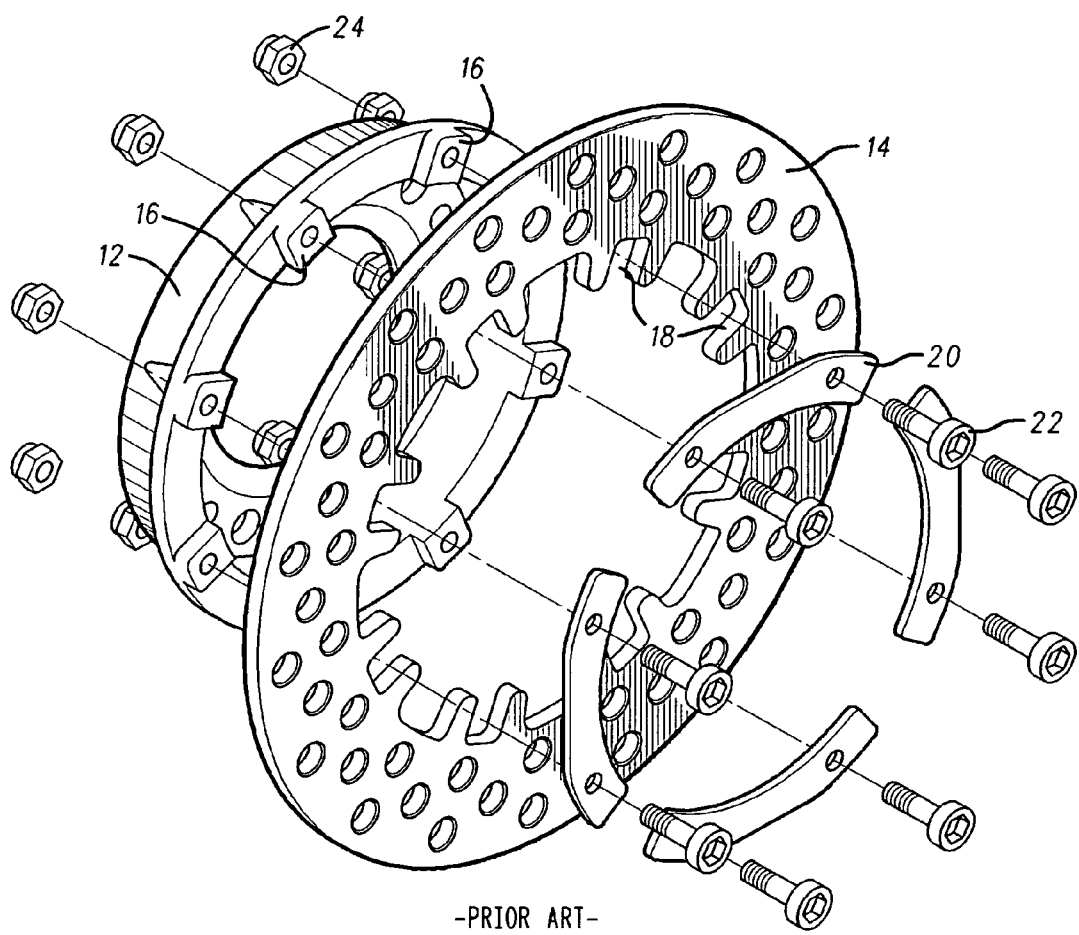
FIG. 1 is an exploded rear perspective view of a prior art disc brake assembly.

The drawing figures are intended to illustrate the general manner of construction and are not necessarily to scale. In the detailed description and in the drawing figures, specific illustrative examples are shown and herein described in detail. It should be understood, however, that the drawing the figures and detailed description are not intended to limit the invention to the particular form disclosed, but are merely illustrative and intended to teach one of ordinary skill how to make and/or use the invention claimed herein and for setting forth the best mode for carrying out the invention.

Figure 2:
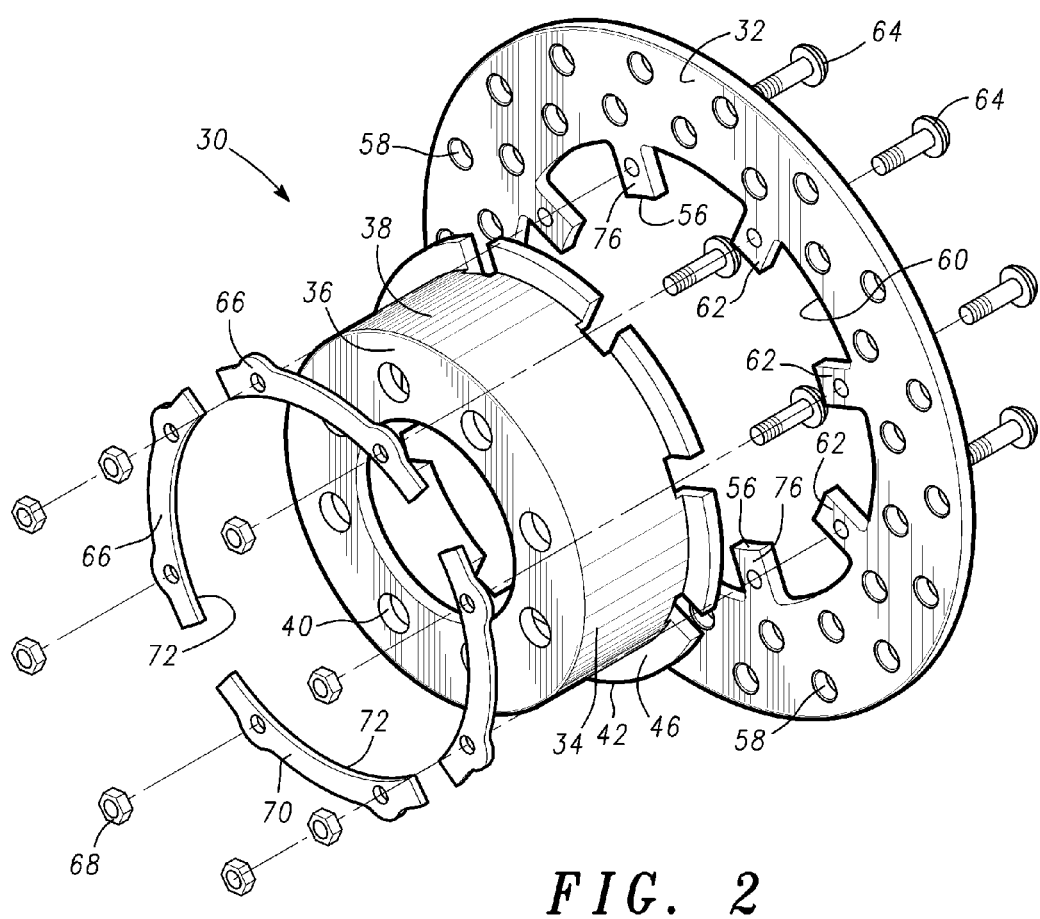
FIG. 2 is an exploded front perspective view of disc brake assembly incorporating features of the present invention.
Figure 3:
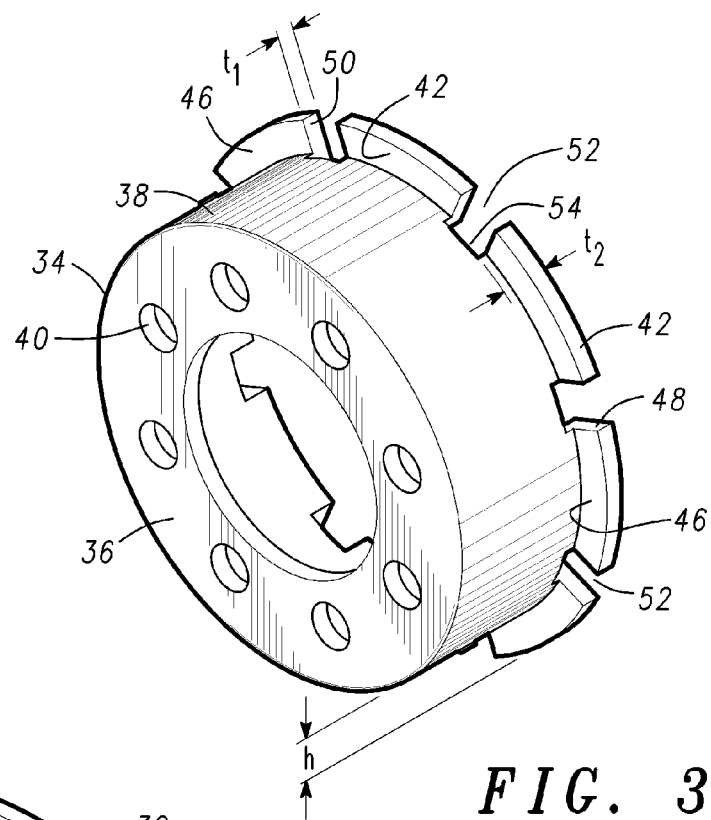
FIG. 3 is a front perspective view of the hub shown in FIG. 2.

With reference to FIGS. 2 and 3, a floating disc brake assembly 30 incorporating features of the present invention comprises a generally disk-shaped brake disc 32 and a generally cylindrical hub 34. Hub 34 comprises a mounting flange 36 and a substantially cylindrical axially extending outer wall 38. A number of mounting holes 40 are formed in flange 36 to enable hub 34 to be mounted to wheel, spindle, or other rotating shaft. Preferably hub 34 is fabricated as a machined wrought aluminum alloy or as an aluminum forging. Although in the illustrative embodiment, aluminum is the material of choice, other high strength, lightweight materials such as titanium may be advantageously employed to further reduce the rotating and unsprung weight of hub 34. Also, although in the illustrative embodiment, outer wall 38 is cylindrical, outer wall 38 may be hexagonal, octagonal or other regular shape that can rotate about an axis without undue imbalance. Accordingly, as used herein "substantially cylindrical" includes hexagonal, octagonal and other regular prism shapes and may include other bodies of revolution about a single axis, including conical, oblique spheroidal, ogival, etc.

A plurality of drive cogs 42 extend radially outward from outer wall 38 of hub 34, each of drive cogs 42 has an axially inward surface 44, an axially outward surface 46 and an axial thickness $T_1$. Drive cogs 42 each have a circumferentially forward facing surface 48 and a circumferentially reward facing surface 50 that define a plurality of radial slots 52 therebetween. The radial height of each of radial slots 52 is equal to the radial height "H" of drive cogs 42. Hub 34 further includes a plurality of axial slots 54 each of which intersects a corresponding one of radial slots 52. Each of axial slots 54 has an axial thickness $T_2$ (see also FIG. 6) which is greater than the thickness $T_1$ of drive cogs 42. Accordingly, when hub 34 is viewed from the side, outer wall 38 of hub 34 is notched slightly inward from the axially outward surfaces 46 of drive cogs 42. The function of axial slots 54 will be explained more fully hereinafter.

Disc 32 comprises a generally flat circular disc and may advantageously include a plurality cross-drilled holes 58 well understood in the art to improve disc cooling and to reduce contaminant build-up. The inner diameter 60 of disc 32 includes a plurality of radially inwardly extending teeth 62, the radially inward surfaces 56 of which extend to a diameter that is less than the outer diameter of the axially extending wall 38 such that each of teeth 62 fit within a corresponding radial slot 52 and thereby engage the circumferentially forward facing surface 48 and circumferentially rearward facing surface 50 of corresponding drive cogs 42. In the illustrative embodiment, disc 32 is machined from a steel alloy such as 1018 or 1020 steel, however disc 32 may be made from any suitable material such as carbon-carbon or other materials known to those skilled in the art without departing from the scope of the present inventions.

Figure 4:
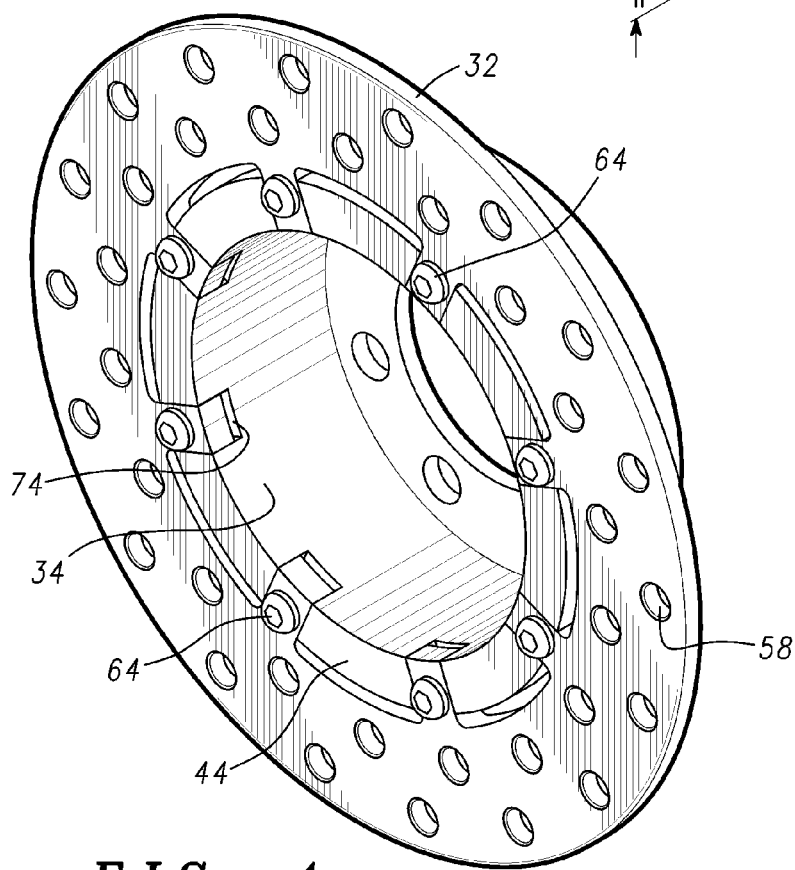
FIG. 4 is a rear perspective view of the disc brake assembly of FIG. 2 shown assembled.
Figure 5:
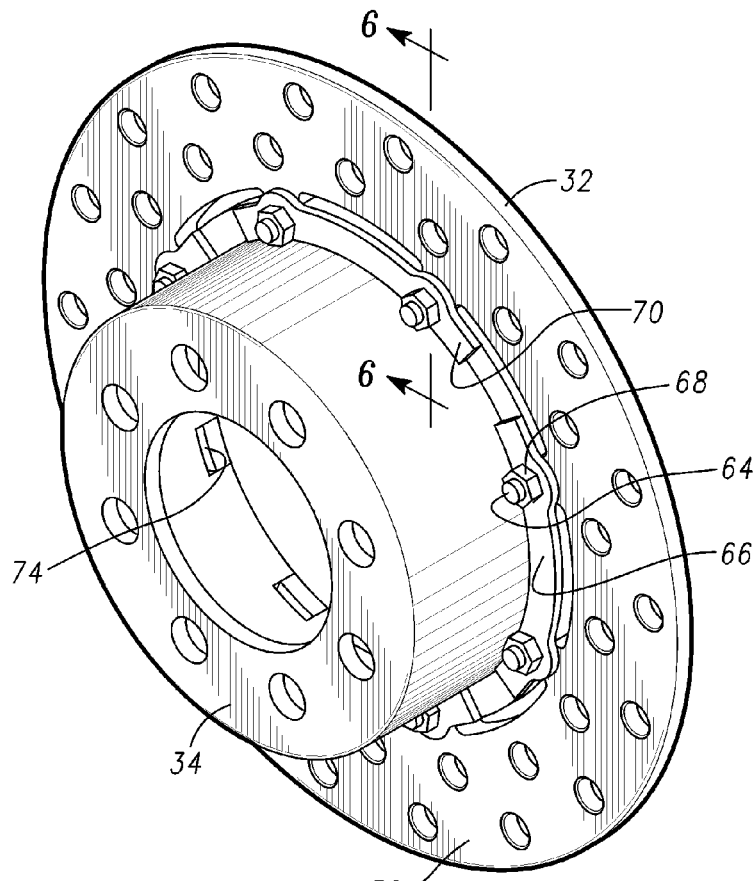
FIG. 5 is a front perspective view of the disc brake assembly of FIG. 2 shown assembled.

With further reference to FIGS. 4 and 5, disc 32 is assembled to hub 34 by means of a plurality of threaded fasteners 64 which pass through corresponding apertures in teeth 62 and corresponding apertures in retainers 66. Corresponding nuts 68 are torqued onto threaded fasteners 64 to hold retainers 66 so that the axially inward facing surfaces 72 of retainers 66 are held tightly against the axially outward facing surfaces 76 of teeth 62. Preferably, retainers 66 are stamped from a titanium alloy such as Ti-6Al-4V, however, other materials such as precipitation hardening stainless steel alloys, or other materials known to those skilled in the art may be used without departing from the scope of the present invention.

Figure 6:
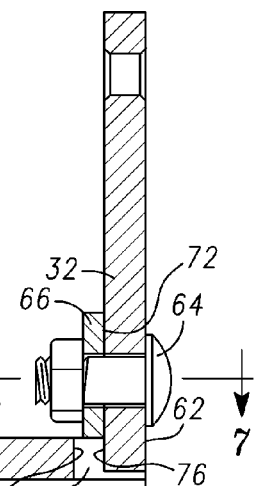
FIG. 6 is a cross-sectional view taken along line 6-6 of FIG. 5.
Figure 7:
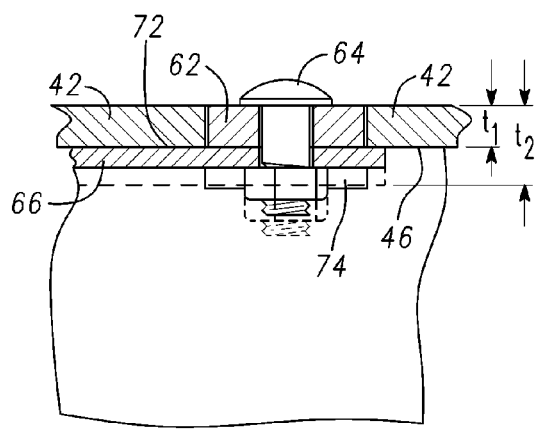
FIG. 7 is a cross-sectional view taken along 7-7 of FIG. 6.

With further reference to FIGS. 6 and 7, with retainers 66 secured tightly against the axially outward facing surfaces 76 of teeth 62, if disc 32 is moved to its axially inward most position, it is prevented from disengaging hub 34 because axially inward surfaces 72 of the flange portions 70 of retainers 66 bear against the axially outward surfaces 46 of drive cogs 42. In this position, however, because the depth $T_2$ of axially slots 54 is greater than the thickness $T_1$ of drive cogs 42, there is a gap 74 between the axially outward surfaces 76 of teeth 62 and the bottom surfaces 78 of axial slots 54. This gap 74 enables disc 32 to move axially outward until the axially outward surfaces 76 of teeth 62 bear against the axially inward-facing bottom surfaces 78 of axial slots 54. It should be noted that since the gap 74 is defined entirely by the difference between the depth of radial slots 52 and the thickness of drive cogs 42, gap 74 can be controlled to very precise tolerances since there is no tolerance build up between mating parts. Gap 74 is preferably at least 0.001 inch and most preferably from about 0.001 to 0.010 inch and is determined entirely independent of the thickness of disc 32. Accordingly, the axial float of disc 32 does not change even if disc 32 is changed, for example in the middle of a race. It should be noted that as used herein, the terms "axially outward" and "front" are synonymous and the terms "axially inward" and "rear" are synonymous and are determined with respect to the wheel as a frame of reference or the axle as a frame of reference. Accordingly, the terms should not be limited to a particular orientation.

Figure 8:
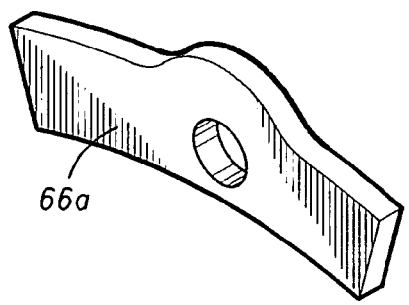
FIG. 8 is a front perspective view of an alternative embodiment of a retainer incorporating features of the present invention.
Figure 10:
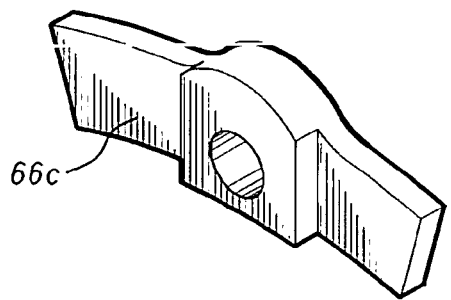
FIG. 10 is a rear perspective view of an alternative embodiment of a retainer incorporating features of the present invention.
Figure 9:
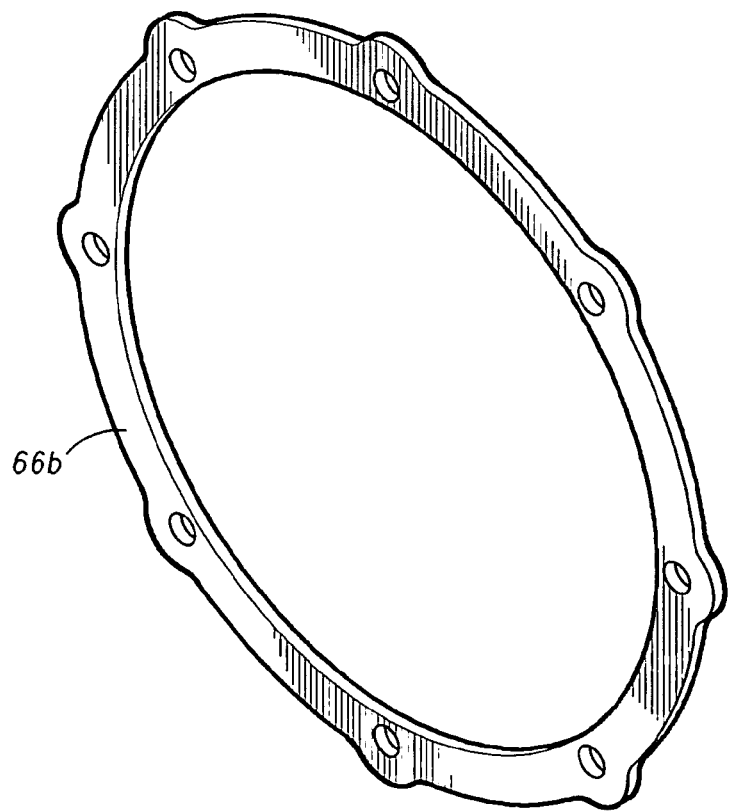
FIG. 9 is a front perspective view of an alternative embodiment of a retainer incorporating features of the present invention.

Although certain illustrative embodiments and methods have been disclosed herein, it will be apparent from the foregoing disclosure to those skilled in the art that variations and modifications of such embodiments and methods may be made without departing from the spirit and scope of the invention. For example, although in the illustrative embodiment of FIGS. 1-7 retainers 66 each comprises an arcuate body with two holes for threaded fasteners, retainers 66 may be single bolt retainers 66a as shown in FIG. 8 or may consist of a single ring retainer 66b as shown in FIG. 9. Similarly, although in the illustrative embodiment of FIGS. 1-7 the axially inward surfaces of retainers 66 are flat, and therefore the axial float of disc 32 is defined by the depth of axial slots 54, in an alternative embodiment as shown in FIG. 10, retainers 66c may be formed with a step to allow disc 32 to float axially inward. Accordingly, any floating disc brake assembly in which the disc is moveable from a first position in which the inward facing surface of the retaining means is spaced apart from the axial surface of the drive cogs to a second position where the retaining means contact the axial outward surface of the drive cogs is considered within the scope of the invention. Therefore, it is intended that the invention shall be limited only to the extent required by the appended claims and the rules and principals of applicable law.

What is claimed is:

1. A disc brake assembly for mounting on a vehicle comprising:
   a hub, said hub comprising a mounting flange and an axially extending outer wall, said hub further comprising a plurality of drive cogs extending radially outward from said axially extending outer wall, each of said plurality of drive cogs having an axial thickness defined by an axially inward facing surface and an axially outward facing surface, each of said drive cogs further comprising a circumferentially forward facing surface and a circumferentially rearward facing surface, said circumferentially forward facing surface and said circumferentially rearward facing surface of adjacent drive cogs of said plurality of drive cogs defining a radial slot therebetween, wherein said circumferentially forward facing surfaces and adjacent circumferentially rearward facing surfaces of said plurality of drive cogs collectively define a plurality of radial slots, said hub further comprising a plurality of axial slots formed in said outer wall intersecting said radial slots, said axial slots having an axial depth greater than said axial thickness of said plurality of drive cogs;
   a brake rotor, said brake rotor comprising a disc member having an axially outward surface and an axially inward surface, said brake rotor further comprising a plurality of teeth extending radially inward from said disc member, said plurality of teeth sized to correspond to said plurality of radial slots for engaging said plurality of drive cogs, each of said plurality of teeth further comprising an axially inward facing surface and an axially outward facing surface; and
   an axially outward retainer rigidly attached to said axially outward facing surface of at least one of said plurality of teeth, said axially outward retainer extending in a circumferential direction beyond said at least one of said plurality of teeth to engage said axially outward facing surface of at least one of said plurality of drive cogs, said axially inward facing surface of said brake rotor having no contact with said hub, said brake rotor being retained from moving axially inward beyond a predetermined distance solely by said axially outward retainer, said predetermined distance being independent of the axial thickness of the brake rotor.

2. The disc brake assembly of claim 1, wherein:
   said axially outward retainer comprises an arcuate member attached to plural of said plurality of teeth.

3. The disc brake assembly of claim 1, further comprising:
   a plurality of axially outward retainers, each of said plurality of axially outward retainers attached to at least one of said plurality of teeth.

4. The disc brake assembly of claim 1, wherein:
   said axially outward retainer comprises a ring shaped member attached to said plurality of teeth.

5. The disc brake assembly of claim 1, wherein:
   said flange of said hub comprises a substantially disk shaped member; and
   said axially extending outer wall of said hub comprises a hollow substantially cylindrical body extending axially inward from said mounting flange.

6. The disc brake assembly of claim 1, wherein:
   the axial depth of said plurality of axial slots exceeds the axial thickness of said plurality of drive cogs by at least 0.001 inch.

7. The disc brake assembly of claim 1, wherein:
   the axial depth of said plurality of axial slots exceeds the axial thickness of said plurality of drive cogs by from 0.001 inch to 0.010 inch.

8. The disc brake assembly of claim 1, wherein;
   said circumferentially forward facing surface and a circumferentially rearward facing surface are parallel.

9. A disc brake assembly for mounting on a vehicle comprising:
   a hub comprising a plurality of radially outwardly extending drive cogs said plurality of drive cogs defining a plurality of radial slots therebetween, each of said plurality of drive cogs having a front surface, a rear surface and an axial thickness, the axial thickness of each of said plurality of drive cogs being substantially equal, said hub further comprising a plurality of axial slots, each of said plurality of axial slots intersecting one of said plurality of radial slots, said axial slots having a radial depth that is less than the radial depth of said radial slots, said axial slots further comprising a bottom surface and an axial depth that is greater than said axial thickness of said plurality of drive cogs, said axial depth of said axial slot defining a gap for providing end-float for a brake rotor, said gap being equal to the extent to which the axial depth of said plurality of axial slots exceeds the axial thickness of said plurality of drive cogs;
   a brake rotor, said brake rotor comprising a disc member having a plurality of teeth extending radially inward from said disc member, said plurality of teeth engaging said plurality of drive cogs along the front and rear surfaces defining the radial slots, each of said teeth further comprising an axially inward facing surface and an axially outward facing surface; and
   axially outward retaining means, said axially outward retaining means being attached to said axially outward facing surface of at least one of said plurality of teeth, said axially outward retaining means comprising an axially inward facing surface capable of bearing against said front surface of at least one of said plurality of drive cogs, said brake rotor being prevented from moving axially outward beyond a limit as said axially outward facing surface of at least one of said plurality of teeth bears against a corresponding bottom surface of one of said plurality of axial slots, said brake rotor further being prevented from moving axially inward beyond a predetermined distance solely by the said axially outward retaining means, said predetermined distance being equal to said gap.

10. The disc brake assembly of claim 9, wherein:
    the axial depth of said plurality of axial slots exceeds the axial thickness of said plurality of drive cogs by at least 0.001 inch.

11. The disc brake assembly of claim 9, wherein:
    the axial depth of said plurality of axial slots exceeds the axial thickness of said plurality of drive cogs by from 0.001 inch to 0.010 inch.

12. A disc brake assembly for mounting on a vehicle comprising:
    a hub, said hub comprising an axially extending outer wall, said hub further comprising a plurality of drive cogs extending radially outward from said outer wall, said plurality of drive cogs having an axially outward facing surface defining a first bearing surface, said plurality of drive cogs further defining a plurality of radial slots therebetween, said axially extending outer wall further comprising a plurality of axial slots, each of said plurality of axial slots intersecting one of said plurality of radial slots, each of said plurality of axial slots further having a bottom surface displaced axially outward from said first bearing surface to define a gap for providing end-float for a brake rotor said gap being equal to the axial displacement of said bottom surface from said first bearing surface;

a brake rotor, said brake rotor comprising a disc member having an axially inward facing surface and an axially outward facing surface, said brake rotor further comprising a plurality of teeth extending radially inward from said disc member to intersect said plurality of axial slots, said plurality of teeth further having circumferential widths sized to correspond to said plurality of radial slots for engaging said plurality of drive cogs, each of said teeth further comprising an axially inward facing surface and an axially outward facing surface; and axially outward retaining means, said axially outward retaining means comprising a flange extending in a circumferential direction from said axially outward facing surface of at least one of said plurality of teeth, said flange further comprising an inward facing surface capable of bearing against said first bearing surface to retain said disc to said hub, said axially inward facing surface of said brake rotor having no contact with said drive cogs, said brake rotor being prevented from moving axially inward beyond the distance of said gap solely by said axially outward retaining means.

13. The disc brake assembly of claim 12, wherein:
said axially outward retaining means comprises a plurality of arcuate members each attached to plural of said plurality of teeth.

14. The disc brake assembly of claim 12, further comprising:
said axially outward retaining means comprises a plurality of arcuate members having a flat axially inward facing surface.

15. The disc brake assembly of claim 12, wherein:
said axially outward retaining means comprises a ring shaped member attached to said plurality of teeth.

16. The disc brake assembly of claim 12, wherein:
said gap is from 0.001 to 0.010 inch.

17. A disc brake assembly for mounting on a vehicle comprising:
a hub comprising a plurality of radially outwardly extending drive cogs, said plurality of drive cogs each having an axially outward facing surface defining a first bearing surface, said plurality of drive cogs further defining a plurality of radial slots therebetween, each of said radial slots intersecting an axial slot having an axially inward facing bottom surface defining a second bearing surface;

a brake rotor, said brake rotor comprising a disc member having an axially inward facing surface and an axially outward facing surface, said brake rotor further comprising a plurality of teeth extending radially inward and having circumferential widths sized to correspond to said plurality of radial slots for engaging said plurality of drive cogs, each of said plurality of teeth having an axially outward facing surface; and axially outward retaining means, said axially outward retaining means comprising a flange extending circumferentially outward from said axially outward facing surface of at least one of said plurality of teeth, said flange having an axially inward facing surface capable of bearing against said first bearing surface of said plurality of drive cogs, said brake rotor being moveable axially from a first position in which said inward facing surface of said axially outward retaining means is spaced apart from said first bearing surface of said plurality of drive cogs to a second position in which said inward facing surface of said axially outward retaining means contacts said first bearing surface of said plurality of drive cogs, said axially inward facing surface of said brake rotor having no contact with said drive cogs, said brake rotor being prevented from moving axially inward beyond a predetermined distance solely by said axially outward retaining means engaging said first bearing surface, said predetermined distance being independent of the axial thickness of the brake rotor.

18. The disc brake assembly of claim 17, wherein:
said axially outward facing surfaces of said plurality of teeth contact said axially inward facing bottom surfaces of said axial slots when said brake rotor is in said first position.

19. The disc brake assembly of claim 18, wherein:
said predetermined axial clearance is no more than 0.010 inch.

* * * * *

UNITED STATES PATENT AND TRADEMARK OFFICE
CERTIFICATE OF CORRECTION

PATENT NO. : 7,654,365 B2  Page 1 of 1
APPLICATION NO. : 11/486651
DATED : February 2, 2010
INVENTOR(S) : Roger A. Lamb It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this

Twenty-third Day of November, 2010

David J. Kappos
*Director of the United States Patent and Trademark Office*